United States Patent
Walachowski et al.

(10) Patent No.: US 12,317,859 B2
(45) Date of Patent: Jun. 3, 2025

(54) MILKING PARLOR ARRANGEMENT, COMPUTER PROGRAM AND NON-VOLATILE DATA CARRIER

(71) Applicant: DELAVAL HOLDING AB, Tumba (SE)

(72) Inventors: Marcin Walachowski, Tumba (SE); Tomasz Zawislanski, Tumba (SE)

(73) Assignee: DeLaval Holding AB, Tumba (SE)

(*) Notice: Subject to any disclaimer, the term of this patent is extended or adjusted under 35 U.S.C. 154(b) by 691 days.

(21) Appl. No.: 17/764,738

(22) PCT Filed: Oct. 1, 2020

(86) PCT No.: PCT/SE2020/050923
§ 371 (c)(1),
(2) Date: Mar. 29, 2022

(87) PCT Pub. No.: WO2021/066719
PCT Pub. Date: Apr. 8, 2021

(65) Prior Publication Data
US 2022/0400649 A1    Dec. 22, 2022

(30) Foreign Application Priority Data
Oct. 2, 2019 (SE) .................................. 1951122-9

(51) Int. Cl.
*A01K 1/12* (2006.01)

(52) U.S. Cl.
CPC ..................... *A01K 1/126* (2013.01)

(58) Field of Classification Search
CPC ........ A01K 1/126; A01K 1/035; A01K 29/00; A01J 5/00; A01J 7/00; G05B 1/00;
(Continued)

(56) References Cited

U.S. PATENT DOCUMENTS

| 3,491,496 A | 1/1970 | Johnston |
| 3,835,814 A * | 9/1974 | Jacobs ................. A01K 1/126 119/14.04 |
| 5,453,053 A | 9/1995 | Danta et al. |

(Continued)

FOREIGN PATENT DOCUMENTS

| CN | 208716231 U | * | 4/2019 |
| CN | 109720814 A | * | 5/2019 |

(Continued)

OTHER PUBLICATIONS

International Search Report for PCT/SE2020/050923, mailed Dec. 16, 2020, 3 pages.
(Continued)

*Primary Examiner* — Yongjia Pan
(74) *Attorney, Agent, or Firm* — NIXON & VANDERHYE (57) ABSTRACT

A drive unit causes a rotating platform of a rotary milking parlor arrangement to move in a direction of rotation. The drive unit includes first and second drive motors arranged to engage a drive rail of the rotating platform and act on a respective side of the drive rail to cause the rotating platform to move. Each of the drive motors produces a respective pace signal indicating a rotational speed of the drive motor in question. A control unit receives the pace signals from each of the drive motors in each drive unit. The control unit compares the pace signal from the first drive motor with the pace signal from the second drive motor from each drive unit to establish a respective difference in the rotational speeds in the drive unit. If the difference exceeds a threshold value, the control unit triggers an alarm.

18 Claims, 3 Drawing Sheets

(58) Field of Classification Search
CPC .................. G05B 23/00; G05B 23/027; G05B 2219/24127; G05B 2219/31439; G05B 2219/34457; G05B 2219/37546; G05B 2219/49139
See application file for complete search history.

(56) References Cited

U.S. PATENT DOCUMENTS

| | | | | |
|---|---|---|---|---|
| 2011/0308467 | A1* | 12/2011 | Eckhardt | A01K 1/126 119/14.04 |
| 2012/0204797 | A1* | 8/2012 | Courtemanche | A01K 1/126 119/14.02 |
| 2016/0151877 | A1* | 6/2016 | Zhao | B24B 49/105 451/5 |
| 2016/0278340 | A1 | 9/2016 | Courtemanche | |
| 2019/0373850 | A1* | 12/2019 | McDougal | F16C 43/06 |

FOREIGN PATENT DOCUMENTS

| | | | |
|---|---|---|---|
| DE | 41 01 530 | 7/1992 | |
| DE | 10212676 C1 * | 6/2003 | ............. A01K 1/126 |
| JP | H03-19636 | 1/1991 | |
| NZ | 270955 | 11/1996 | |
| WO | 2007/117162 | 10/2007 | |
| WO | 2013/158126 | 10/2007 | |
| WO | WO-2018226144 A1 * | 12/2018 | ............. A01J 5/003 |
| WO | 2019/053701 | 3/2019 | |

OTHER PUBLICATIONS

Written Opinion of the ISA for PCT/SE2020/050923, mailed Dec. 16, 2020, 7 pages.
Search Report for SE1951122-9, mailed Mar. 13, 2020, 3 pages.

* cited by examiner

MILKING PARLOR ARRANGEMENT, COMPUTER PROGRAM AND NON-VOLATILE DATA CARRIER

This application is the U.S. national phase of International Application No. PCT/SE2020/050923 filed Oct. 1, 2020 which designated the U.S. and claims priority to SE 1951122-9 filed Oct. 2, 2019, the entire contents of each of which are hereby incorporated by reference.

TECHNICAL FIELD

The present invention relates generally to solutions in which animals are located on a rotating platform while being milked. Especially, the invention relates to a system for controlling a rotating platform of a rotary milking parlor arrangement and a method implemented in such a system. The invention also relates to a corresponding computer program and a non-volatile data carrier storing such a computer program.

BACKGROUND

Today's automatic milking arrangements are highly complex installations. In particular, a rotary milking parlor arrangement is one such example. Namely, here, a very heavy platform carrying a large number of animals is rotated, while milking machines milk the animals located thereon. Powerful electric motors are required to effect the rotation of the platform. For example to adjust the rotation speed based on the milking characteristics of the animals currently on the platform, these motors must also be controllable with very high accuracy. Moreover, in case of an accident or a malfunction, it must be possible to stop and/or reverse the rotation of the platform immediately.

Typically, one or more friction drive wheels are arranged below the platform, which wheels act vertically on the platform to make it rotate. For the desired control, an integrated brake system may also be employed, for example as described in US 2016/0278340.

The applicant has found that the efficiency and reliability of the system can be improved if the drive mechanism can is organized in one or more drive units that are arranged underneath the rotating platform to rotate the same, where each drive unit includes first and second drive motors that cooperate with one another. Here, the first drive motor is arranged to engage a drive rail of the platform and act on one side of the drive rail. The second drive motor is arranged to engage and act on the opposite side of the drive rail. The two motors are continuously pushed towards one another to minimize the slippage relative to the drive rail.

However, if one of the drive motors in a particular drive unit accidentally stops, there is a considerable risk that the friction between this stationary drive motor and the still operating drive motor pushes the drive rail upwards to such an extent that the platform derails. This, of course, may lead to both costly and dangerous consequences.

SUMMARY

The object of the present invention is therefore to offer a design that avoids the above problem. It is also an object of the invention to provide an early notification of any malfunctioning platform drive mechanisms.

According to one aspect of the invention, the object is achieved by a system for controlling a rotary milking parlor arrangement, which includes a rotating platform with a plurality of stalls each of which is configured to house a respective animal during milking. The system also has at least one drive unit and a control unit configured to control the operation of the at least one drive unit. The at least one drive unit is configured to cause the rotating platform to move in at least a first direction of rotation around a rotation point. Each of the at least one drive unit, in turn, contains first and second drive motors arranged to engage a drive rail of the rotating platform and act on a respective side of the drive rail, so as to cause the rotating platform to perform said movement. Each of the first and second drive motors is configured produce a respective pace signal indicating a rotational speed of the drive motor in question. The control unit is configured to receive the pace signals from each of the first and second drive motors in each of the at least one drive unit. The control unit is further configured to compare the pace signal from the first drive motor with the pace signal from the second drive motor from each of the at least one drive unit to establish a respective difference in the rotational speeds. If the difference exceeds a threshold value, the control unit is configured to trigger an alarm. Depending on the current state of the system, the alarm, in turn, may lead to different results. As an initial measure, if the alarm is generated, it is normally appropriate to stop the platform, at least temporarily. In many cases, however, it is possible to continue to operate the platform also after an alarm, provided that appropriate measures are taken in response thereto.

The above system is advantageous because it not only detects any still standing drive motor, however it will also identifies malfunctioning drive motors whose rotational speed deviates excessively from its drive unit counterpart. Hence, the overall risk that the platform derails can be reduced substantially.

According to one embodiment of this aspect of the invention, the control unit is further configured to, in response to the alarm; send a control signal to each drive units whose pace signals triggered the alarm. The control signal is configured to cause that drive unit to be disengaged from the drive rail. Consequently, provided that the system contains at least one drive unit that is still functioning, the system may continue to operate based on this/these drive unit(s). Naturally, this is desirable from a practical point of view, e.g. considering system uptime.

According to another embodiment of this aspect of the invention, each drive unit contains an actuator, which, in response to the control signal is configured to cause the drive unit to be disengaged from the drive rail by separating a first drive wheel from a second drive wheel. Preferably, the actuator contains a pneumatic cylinder, a hydraulic cylinder and/or an electric linear motor that is arranged to separate the first and second drive wheels from one another. Here, the first drive wheel is arranged on a first side of the drive rail and is operated by a first drive motor in the drive unit, and the second drive wheel is arranged on a second side of the drive rail and is operated by a second drive motor in the drive unit. Thereby, disengagement of a malfunctioning drive unit can be effected in a very straightforward manner.

It is also advantageous if each drive unit has a sensor, which, in response to the control signal is configured to check if the first drive wheel has been properly separated from the second drive wheel. If this is found to be the case, the sensor is configured to send a return signal to the control unit. The return signal confirms a successful disengagement of the drive unit from the drive rail. Consequently, the control unit is informed about in which manner the drive unit in question may influence continued operation of the rotating platform.

According to yet another embodiment of this aspect of the invention, each drive unit contains at least one clamping member, which, in an engaged mode, is configured to force the first drive wheel towards the first side of the drive rail and force the second drive wheel towards the second side of the drive rail. As a result, adequate contact between the drive wheels and the drive rail will maintained also if there is some unevenness in the drive rail. Moreover, it is straightforward to release the clamping member in connection with disengagement via the above-mentioned actuator.

According to a further embodiment of this aspect of the invention, each drive unit contains an indicator-sensor arrangement configured to produce the pace signals that indicate the rotational speed of the first and second drive motors respectively. The indicator-sensor arrangement includes first and second toothed metal collars. The first toothed metal collar is mechanically linked to the first drive motor, and a first inductive sensor is configured to detect a movement of the first toothed metal collar to produce a first pace signal. The second toothed metal collar is mechanically linked to the second drive motor, and a second inductive sensor is configured to detect a movement of the second toothed metal collar to produce a second pace signal. This provides a reliable monitoring of the drive motors' rotation speed, since the design is tolerant to both dirt and mechanical influence.

Preferably, the first toothed metal collar is arranged to rotate together with the first drive wheel, and the second toothed metal collar is arranged to rotate together with the second drive wheel. Thus, the pace signals are directly linked to the drive motors' action on the drive rail.

According to another aspect of the invention, the object is achieved by a method of controlling a rotary milking parlor arrangement that includes a rotating platform with a plurality of stalls each of which is configured to house a respective animal during milking. It is further presumed that the system contains at least one drive unit configured to cause the rotating platform to move in at least a first direction of rotation around a rotation point. The method involves controlling the operation of the at least one drive unit. It is further presumed that each of the at least one drive unit contains first and second drive motors being arranged to engage a drive rail of the rotating platform and act on a respective side of the drive rail so as to cause the rotating platform to perform said movement. Each of the first and second drive motors is configured produce a respective pace signal indicating a rotational speed of the drive motor in question. The method further involves: receiving the pace signals from each of said first and second drive motors in each drive unit; comparing the pace signal from the first drive motor with the pace signal from the second drive motor from each drive unit to establish a respective difference in the rotational speeds in each of said at least one drive unit; and if the difference exceeds a threshold value, triggering an alarm. The advantages of this method, as well as the preferred embodiments thereof, are apparent from the discussion above with reference to the system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
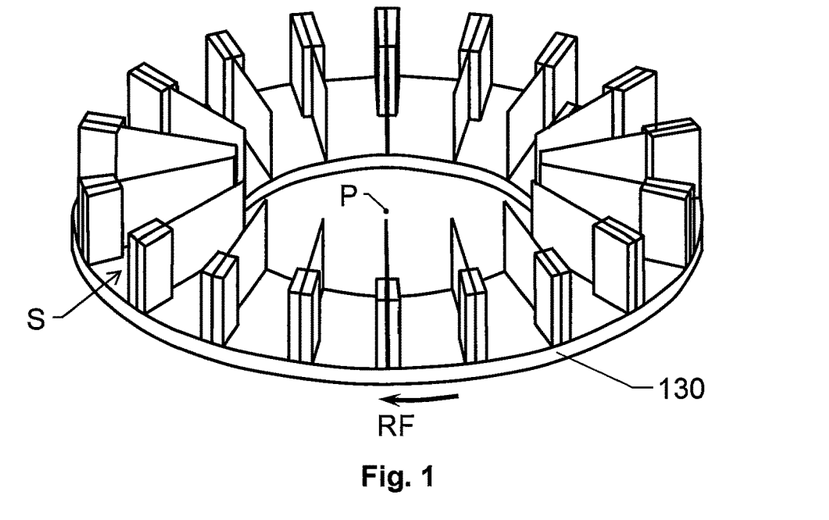
FIG. 1 shows a rotating platform of a rotary milking parlor arrangement according to one embodiment the invention.

In FIG. 1, we see a rotating platform 130, which forms part of a rotary milking parlor arrangement. In this example, the rotating platform 130 has 18 milking stalls S. Of course, however, any higher or lower number of stalls S is conceivable according to the invention. Nevertheless, each stall S is configured to house a respective animal while being milked by a milking machine.

The system according to the invention contains at least one drive unit and a control unit 220. FIG. 1 shows five drive units, namely 241, 242, 243, 244 and 245 respectively, which are configured to cause the rotating platform 130 to move in at least a first direction RF of rotation around a rotation point P. Depending on the size of the rotating platform 130, the number of drive units may be anything from one and up, say to twelve.

Figure 3A:
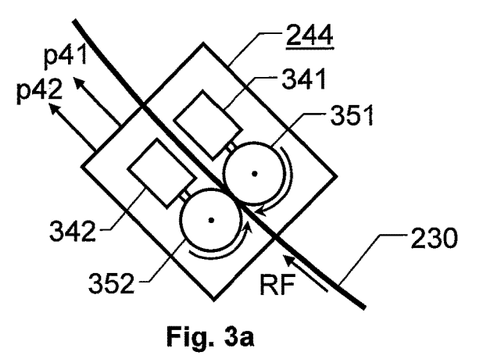
FIGS. 3a-b show schematic views of a drive unit according to one embodiment the invention.
Figure 3B:
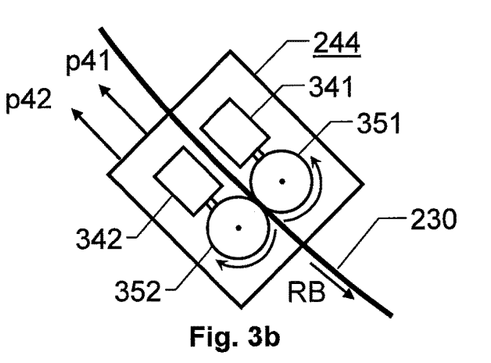

FIGS. 3a and 3b show schematic views of a drive unit 244 according to one embodiment the invention. FIG. 3a illustrates an operation of the drive unit 244 where the rotating platform 130 is caused to move in a first direction RF, say forward; and FIG. 3b illustrates operation of the drive unit 244 where the rotating platform 130 is caused to move in a second direction RB, say backward. Each drive unit includes first and second drive motors 341 and 342 that are arranged to engage a drive rail 230 of the rotating platform 130, which drive rail 230 preferably is located under the rotating platform 130 and follows the circular outline of the rotating platform 130. The drive units act on a respective side of the drive rail 230 so as to cause the rotating platform 130 to perform its movement. Each of the first and second drive motors 341 and 341 in each drive unit 241, 242, 243, 244 and 245 is configured produce a respective pace signal p11, p12; p21, p22; p31, p32; p41, p42 and p51, p52 indicating a rotational speed of the drive motor in question.

Figure 2:
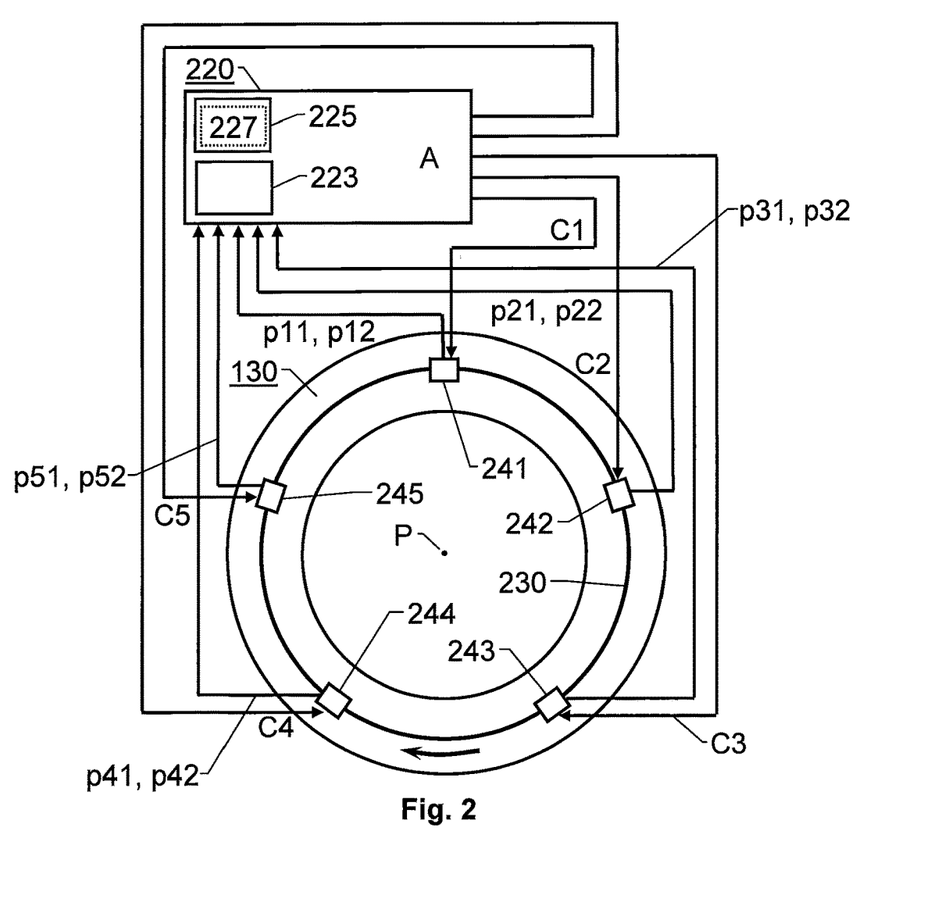
FIG. 2 illustrates a system for controlling a rotating platform according to one embodiment the invention.

The control unit 220 is configured to control the operation of the drive units 241, 242, 243, 244 and 245. Inter alia, this means that the control unit 220 is configured to receive the pace signals p11, p12; p21, p22; p31, p32; p41, p42 and p51, p52 from each of the first and second drive motors 341 and 342 in each of the drive units 241, 242, 243, 244 and 245.

The control unit 220 is further configured to compare the pace signal p41 from the first drive motor 341 with the pace signal p42 from the second drive motor 342 from each drive unit 241, 242, 243, 244 and 245 to establish a respective difference in the rotational speeds in each of said at least one drive unit. If the difference exceeds a threshold value, the control unit 220 is configured to trigger an alarm A. The alarm A may be expressed in the form of an acoustic and/or optic signal adapted to warn an operator. Alternatively or additionally, the alarm may also be represented by a signal, which is transmitted wirelessly or by cable to a surveillance unit where it is configured to provide notification to a user and/or to be registered in an automatic recording means, e.g. a data log.

In response to the alarm A, the control unit 220 is preferably configured to cause the platform 130 to stop, at least temporarily until the measures have been taken to overcome the problem that caused the alarm A to be generated. In response to the alarm A, the control unit 220 is preferably further configured to send a control signal to each drive units whose pace signals triggered the alarm A. Assuming that it was the pace signals p41 and p42 from the drive unit 244 that caused the alarm to be triggered, the control unit 220 thus sends the control signal C4 to this drive unit 244. The control signal C4 is configured to cause the drive unit 244 to be disengaged from the drive rail 230.

Figure 4:
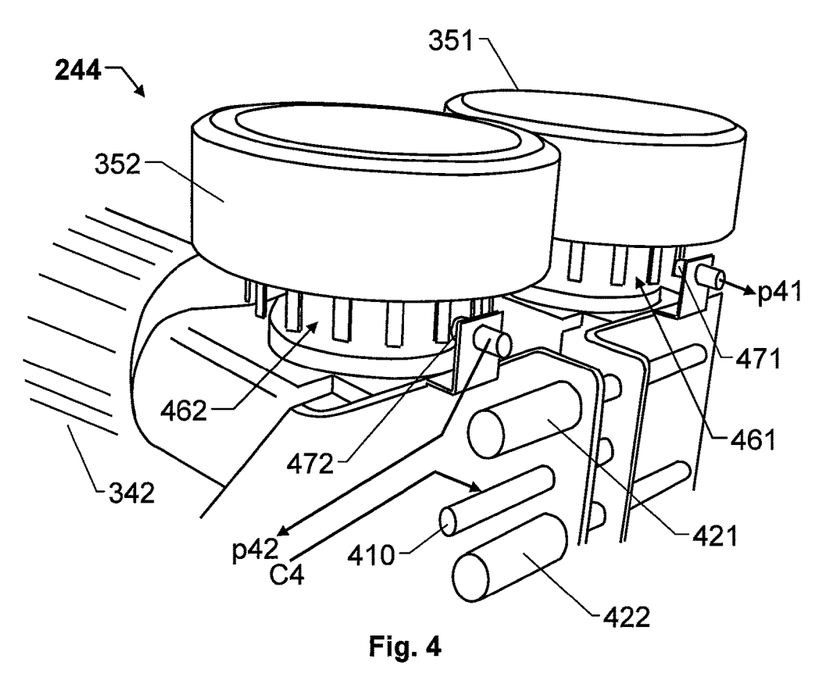
FIG. 4 shows a perspective view of a drive unit according to one embodiment the invention.

Referring now also to FIG. 4, the drive unit 244 may for example contain an actuator 410, which, in response to the control signal C4 is configured to cause the drive unit 244 to be disengaged from the drive rail 230 by separating a first drive wheel 351 from a second drive wheel 352. The actuator 410, in turn, may include a pneumatic cylinder, a hydraulic cylinder and/or an electric linear motor that is arranged to separate the first and second drive wheels 351 and 352 from one another.

The first drive wheel 351 is arranged on a first side of the drive rail 230, e.g. on the inside of a circular loop formed by the drive rail 230. The first drive wheel 351 is operated by a first drive motor 341 in the drive unit 244. The second drive wheel 352 is arranged on a second side of the drive rail 230, e.g. on the outside of the circular loop, and is operated by a second drive motor 342 in the drive unit 244.

Figure 5A:
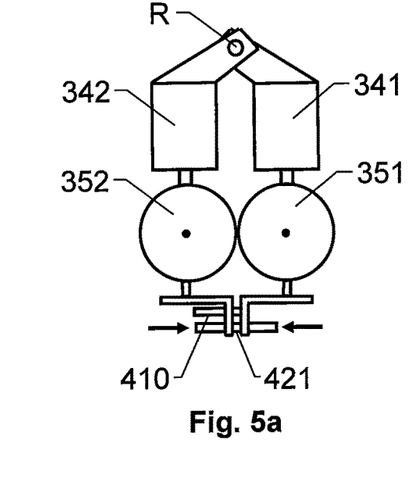
FIGS. 5a-b schematically illustrate how a drive unit is disengaged according to one embodiment the invention.
Figure 5B:
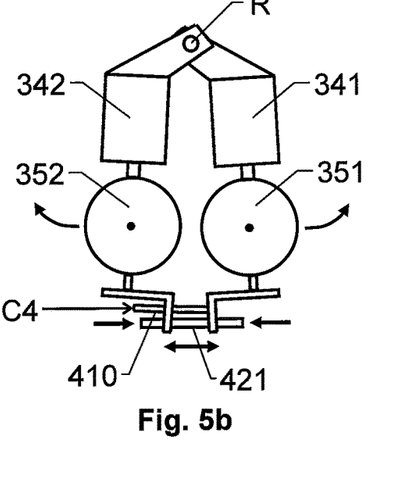

Preferably, the drive unit 244 contains at least one clamping member, which, in an engaged mode, is configured to force the first drive wheel 351 towards the first side of the drive rail 230 and force the second drive wheel 352 towards the second side of the drive rail 230. The embodiment of the invention shown in FIG. 4 has two clamping members 421 and 422 respectively, which can be represented by resilient elements, such as helical and/or leaf springs. Hence, in practice, whenever the actuator 410 is inactivated, the clamping members 421 and 422 press the drive wheels 351 and 352 towards drive rail 230, so that drive wheels 351 and 352 engage the drive wheel and may cause the platform 130 to rotate. FIGS. 5a and 5b illustrate this functionality, where activation of the actuator 410 results in that the entire motor and drive wheel arrangements 341/351 and 342/352 respectively are swung away from one another by rotation around an axis R.

According to one embodiment of the invention, the drive unit 244 contains at least one sensor, which, in response to the control signal C4, is configured to check if the first drive wheel 351 has been properly separated from the second drive wheel 352. If it is found that the first drive wheel 351 has indeed been properly separated from the second drive wheel 352, the at least one sensor is configured to send a return signal (not shown) to the control unit 220. The return signal confirms a successful disengagement of the drive unit 244 from the drive rail 230. Thereby, the control unit 220 is informed about to what extent the drive unit 244 may influence continued operation of the rotating platform 130. For example, if the system contains a comparatively large number of drive units, it is typically possible to disengage one or two of these drive units without any major impact on the system's overall function, especially if the drive units concerned are non-neighbors to one another. However, if the original number drive units in the system is relatively low, say below four, it is usually not possible to continue to operate the rotating platform 130 with less than all drive units active. Namely, in addition to propelling the rotating platform 130, the drive units are preferably also arranged to maintain steady rotation around the rotation point P. If the distribution of active drive units becomes too unbalanced, it may be difficult, or even impossible, to ensure such a steady rotation around a fix rotation point.

Of course, in the event that the disengagement of a malfunctioning drive unit fails, the rotating platform 130 cannot continue to be operated. Thus, if the control unit 220 does not receive the return signal within a particular interval after having sent out the control signal C4, the control unit 220 is configured to cause the rotating platform 130 to stop.

Returning now to FIG. 4, according to one embodiment of the invention, each drive unit 244 has an indicator-sensor arrangement that is configured to produce the pace signals p41 and p42 indicating the rotational speed of the first and second drive motors 341 and 342 respectively in the drive unit 244. The indicator-sensor arrangement contains first and second toothed metal collars 461 and 462 respectively.

The first toothed metal collar 461 is mechanically linked to the first drive motor 341, for example by being arranged to rotate together with the first drive wheel 351. A first inductive sensor 471 is configured to detect a movement of the first toothed metal collar 461 and in response thereto to produce a first pace signal p41. Analogously, the second toothed metal collar 462 is mechanically linked to the second drive motor 342, for example by being arranged to rotate together with the second drive wheel 352. A second inductive sensor 472 is configured to detect a movement of the second toothed metal collar 462 to produce a second pace signal p42. The first and second toothed metal collars 461 and 462 are preferably designed such that a relationship between tooth width and tooth interspacing lies in a range from 50-to-50 to 25-to-75, preferably around ⅓-to-⅔.

It is generally advantageous if the control unit 220 is configured to effect the above-described procedure in an automatic manner by executing a computer program 227. Therefore, the control unit 220 may include a memory unit 225, i.e. non-volatile data carrier, storing the computer program 227, which, in turn, contains software for making processing circuitry in the form of at least one processor 223 in the central control unit 220 execute the above-described actions when the computer program 227 is run on the at least one processor 223.

Figure 6:
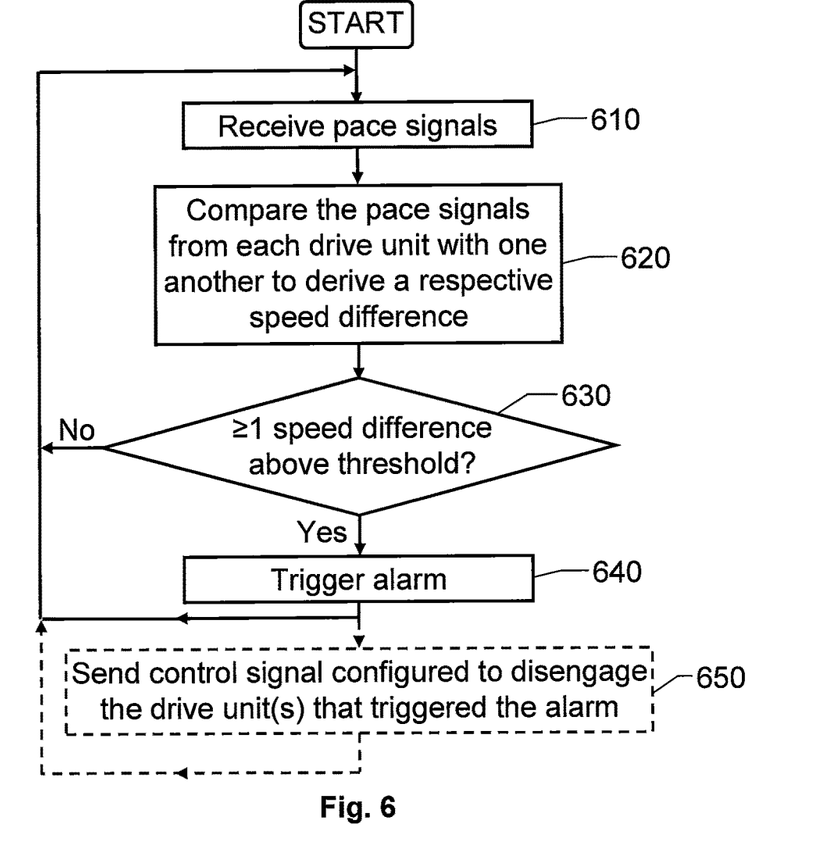
FIG. 6 illustrates, by means of a flow diagram, the general method according to the invention.

In order to sum up, and with reference to the flow diagram in FIG. 6, we will now describe the general method according to the invention of controlling a rotating platform of a rotary milking parlor.

In a first step 610, pace signals are received from each drive motor in each drive unit. Thus, if for example there are four drive units, a total of eight pace signals are received.

Then, in a step 620, the pace signal from the first drive motor is compared with the pace signal from the second drive motor from each drive unit to establish a respective difference in the rotational speeds in each drive unit.

In a subsequent step 630, it is checked if the difference exceeds a threshold value, and if so, a step 640 follows. Otherwise, the procedure loops back to step 610.

In step 640, an alarm is triggered, which indicates a functionality problem in at least one drive unit. Preferably, the alarm also specifies the drive unit(s) that caused the alarm to be triggered.

In a preferred embodiment of the invention, a step 650 follows after step 640. In step 650, in response to the alarm, a control signal is sent to each drive unit that caused the alarm to be triggered, which control signal is configured to result in that the drive unit in question is disengaged from the drive rail of the rotating platform. Thus, the rotary milking parlor can continue to be operated, at least temporarily, for example while emptying the rotating platform of animals.

After step 640 or 650, the procedure loops back to step 610.

All of the process steps, as well as any sub-sequence of steps, described with reference to FIG. 6 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for controlling a rotary milking parlor arrangement, which comprises a rotating platform (130) with a plurality of stalls(S) each of which is configured to house a respective animal during milking, the system comprising: at least one drive unit (241, 242, 243, 244, 245) configured to cause the rotating platform (130) to move in at least a first direction (RF, RB) of rotation around a rotation point (P), and a control unit (220) configured to control operation of the at least one drive unit (241, 242, 243, 244, 245), wherein, each of the at least one drive unit comprises first and second drive motors (341, 342) arranged to engage a drive rail (230) of the rotating platform (130) and act on a respective side of the drive rail (230) so as to cause the rotating platform (130) to perform movement of the rotary milking parlor each of said first and second drive motors (341, 342) being configured to produce a respective pace signal (p11, p12; p21, p22; p31, p32; p41, p42; p51, p52) indicating a rotational speed of the respective first and second drive motors, and the control unit (220) is further configured to:

receive the pace signals (p11, p12; p21, p22; p31, p32; p41, p42; p51, p52) from each of said first and second drive motors (341, 342) in each of said at least one drive unit (241, 242, 243, 244, 245), compare the pace signal (p41) from the first drive motor (341) with the pace signal (p42) from the second drive motor (342) from each of said at least one drive unit (241, 242, 243, 244, 245) to establish a respective difference in the rotational speeds in each of said at least one drive unit, and when the difference exceeds a threshold value, trigger an alarm (A).

2. The system according to claim 1, wherein the control unit (220) is further configured to, in response to the alarm (A), send a control signal (C4) to each of said at least one drive unit (244) whose pace signals (p41, p42) triggered the alarm (A), which control signal (C4) is configured to cause said at least one drive unit (244) that triggered the alarm (A) to be disengaged from the drive rail (230).

3. The system according to claim 2, wherein each of said at least one drive unit (241, 242, 243, 244, 245) comprises an actuator (410), which, in response to the control signal (C4) is configured to cause the at least one drive unit (244) to be disengaged from the drive rail (230) by separating a first drive wheel (351) from a second drive wheel (352), the first drive wheel (351) being arranged on a first side of the drive rail (230) and is operated by a first drive motor (341) in the drive unit (244), and the second drive wheel (352) being arranged on a second side of the drive rail (230) and is operated by a second drive motor (342) in the drive unit (244).

4. The system according to claim 3, wherein the actuator (410) comprises at least one of a pneumatic cylinder, a hydraulic cylinder and an electric linear motor that is arranged to separate the first and second drive wheels (351; 352) from one another.

5. The system according to claim 4, wherein each of said at least one drive unit (241, 242, 243, 244, 245) comprises at least one clamping member (421, 422), which, in an engaged mode, is configured to force the first drive wheel (351) towards the first side of the drive rail (230) and force the second drive wheel (352) towards the second side of the drive rail (230).

6. The system according to claim 4, wherein each of said at least one drive unit (241, 242, 243, 244, 245) further comprises at least one sensor, which, in response to the control signal (C4), is configured to:

check that the first drive wheel (351) has been properly separated from the second drive wheel (352), and when the first drive wheel (351) has been found to have been properly separated from the second drive wheel (352), send a return signal to the control unit (220), which return signal confirms a successful disengagement of the at least one drive unit (241, 242, 243, 244, 245) from the drive rail (230).

7. The system according to claim 4, wherein each of said at least one drive unit (241, 242, 243, 244, 245) comprises an indicator-sensor arrangement configured to produce the pace signals (p41, p42) indicating the rotational speed of the first and second drive motors (341, 342) respectively in the drive unit (244), which indicator-sensor arrangement comprises:
   a first toothed metal collar (461) mechanically linked to the first drive motor (341), and a first inductive sensor (471) configured to detect a movement of the first toothed metal collar (461) to produce a first pace signal (p41), and
   a second toothed metal collar (462) mechanically linked to the second drive motor (342), and a second inductive sensor (472) configured to detect a movement of the second toothed metal collar (462) to produce a second pace signal (p42), wherein,
   the first toothed metal collar (461) is arranged to rotate together with the first drive wheel (351), and
   the second toothed metal collar (462) is arranged to rotate together with the second drive wheel (352).

8. The system according to claim 3, wherein each of said at least one drive unit (241, 242, 243, 244, 245) comprises at least one clamping member (421, 422), which, in an engaged mode, is configured to force the first drive wheel (351) towards the first side of the drive rail (230) and force the second drive wheel (352) towards the second side of the drive rail (230).

9. The system according to claim 8, wherein each of said at least one drive unit (241, 242, 243, 244, 245) further comprises at least one sensor, which, in response to the control signal (C4), is configured to:
   check that the first drive wheel (351) has been properly separated from the second drive wheel (352), and when the first drive wheel (351) has been found to have been properly separated from the second drive wheel (352), send a return signal to the control unit (220), which return signal confirms a successful disengagement of the at least one drive unit (241, 242, 243, 244, 245) from the drive rail (230).

10. The system according to claim 8, wherein each of said at least one drive unit (241, 242, 243, 244, 245) comprises an indicator-sensor arrangement configured to produce the pace signals (p41, p42) indicating the rotational speed of the first and second drive motors (341, 342) respectively in the drive unit (244), which indicator-sensor arrangement comprises:
   a first toothed metal collar (461) mechanically linked to the first drive motor (341), and a first inductive sensor (471) configured to detect a movement of the first toothed metal collar (461) to produce a first pace signal (p41), and
   a second toothed metal collar (462) mechanically linked to the second drive motor (342), and a second inductive sensor (472) configured to detect a movement of the second toothed metal collar (462) to produce a second pace signal (p42), wherein,
   the first toothed metal collar (461) is arranged to rotate together with the first drive wheel (351), and
   the second toothed metal collar (462) is arranged to rotate together with the second drive wheel (352).

11. The system according to claim 3, wherein each of said at least one drive unit (241, 242, 243, 244, 245) further comprises at least one sensor, which, in response to the control signal (C4), is configured to:
   check that the first drive wheel (351) has been properly separated from the second drive wheel (352), and if it is when the first drive wheel (351) has been found to have been properly separated from the second drive wheel (352), send a return signal to the control unit (220), which return signal confirms a successful disengagement of the at least one drive unit (241, 242, 243, 244, 245) from the drive rail (230).

12. The system according to claim 11, wherein each of said at least one drive unit (241, 242, 243, 244, 245) comprises an indicator-sensor arrangement configured to produce the pace signals (p41, p42) indicating the rotational speed of the first and second drive motors (341, 342) respectively in the drive unit (244), which indicator-sensor arrangement comprises:
   a first toothed metal collar (461) mechanically linked to the first drive motor (341), and a first inductive sensor (471) configured to detect a movement of the first toothed metal collar (461) to produce a first pace signal (p41), and
   a second toothed metal collar (462) mechanically linked to the second drive motor (342), and a second inductive sensor (472) configured to detect a movement of the second toothed metal collar (462) to produce a second pace signal (p42), wherein,
   the first toothed metal collar (461) is arranged to rotate together with the first drive wheel (351), and
   the second toothed metal collar (462) is arranged to rotate together with the second drive wheel (352).

13. The system according to claim 3, wherein each of said at least one drive unit (241, 242, 243, 244, 245) comprises an indicator-sensor arrangement configured to produce the pace signals (p41, p42) indicating the rotational speed of the first and second drive motors (341, 342) respectively in the drive unit (244), which indicator-sensor arrangement comprises:
   a first toothed metal collar (461) mechanically linked to the first drive motor (341), and a first inductive sensor (471) configured to detect a movement of the first toothed metal collar (461) to produce a first pace signal (p41), and
   a second toothed metal collar (462) mechanically linked to the second drive motor (342), and a second inductive sensor (472) configured to detect a movement of the second toothed metal collar (462) to produce a second pace signal (p42).

14. The system according claim 1, wherein,
   the first toothed metal collar (461) is arranged to rotate together with the first drive wheel (351), and
   the second toothed metal collar (462) is arranged to rotate together with the second drive wheel (352).

15. The system according to claim 1, wherein each of said at least one drive unit (241, 242, 243, 244, 245) comprises an indicator-sensor arrangement configured to produce the pace signals (p41, p42) indicating the rotational speed of the first and second drive motors (341, 342) respectively in the drive unit (244), which indicator-sensor arrangement comprises:
   a first toothed metal collar (461) mechanically linked to the first drive motor (341), and a first inductive sensor (471) configured to detect a movement of the first toothed metal collar (461) to produce a first pace signal (p41), and a second toothed metal collar (462) mechanically linked to the second drive motor (342), and a second inductive sensor (472) configured to detect a movement of the second toothed metal collar (462) to produce a second pace signal (p42).

16. A method of controlling a rotary milking parlor arrangement, which comprises a rotating platform (130) with a plurality of stalls(S) each of which is configured to house a respective animal during milking, the system comprising at least one drive unit (241, 242, 243, 244, 245) configured to cause the rotating platform (130) to move in at least a first direction (RF, RB) of rotation around a rotation point (P), the method comprising:

controlling operation of the at least one drive unit (241, 242, 243, 244, 245), wherein each of the at least one drive unit comprises first and second drive motors (341, 342) being arranged to engage a drive rail (230) of the rotating platform (130) and act on a respective side of the drive rail (230) so as to cause the rotating platform (130) to perform movement of the rotary milking parlor, each of said first and second drive motors (341, 341) being configured produce a respective pace signal (p11, p12; p21, p22; p31, p32; p41, p42; p51, p52) indicating a rotational speed of the respective first and second drive motors, receiving the pace signals (p11, p12; p21, p22; p31, p32; p41, p42; p51, p52) from each of said first and second drive motors (341, 342) in each of said at least one drive unit (241, 242, 243, 244, 245), comparing the pace signal (p41) from the first drive motor (341) with the pace signal (p42) from the second drive motor (342) from each of said at least one drive unit (241, 242, 243, 244, 245) to establish a respective difference in the rotational speeds in each of said at least one drive unit, and when the difference exceeds a threshold value, triggering an alarm (A).

17. The method according to claim 16, wherein, in response to the alarm (A), the method further comprises:

sending a control signal (C4) to each of said at least one drive unit (244) whose pace signals (p41, p42) triggered the alarm (A), which control signal (C4) is configured to cause that drive unit (244) to be disengaged from the drive rail (230).

18. A non-volatile non-transitory data carrier (225) containing a computer program (227) and communicatively connected to a processing unit (223), the computer program (227) comprising software, when the software of the computer program being run on the processing unit (223) causing execution of a method of controlling a rotary milking parlor arrangement, which comprises a rotating platform (130) with a plurality of stalls(S) each of which is configured to house a respective animal during milking, the system comprising at least one drive unit (241, 242, 243, 244, 245) configured to cause the rotating platform (130) to move in at least a first direction (RF, RB) of rotation around a rotation point (P), the method comprising:

controlling operation of the at least one drive unit (241, 242, 243, 244, 245), wherein each of the at least one drive unit comprises first and second drive motors (341, 342) being arranged to engage a drive rail (230) of the rotating platform (130) and act on a respective side of the drive rail (230) so as to cause the rotating platform (130) to perform movement of the rotary milking parlor, each of said first and second drive motors (341, 341) being configured produce a respective pace signal (p11, p12; p21, p22; p31, p32; p41, p42; p51, p52) indicating a rotational speed of the respective first and second drive motors, receiving the pace signals (p11, p12; p21, p22; p31, p32; p41, p42; p51, p52) from each of said first and second drive motors (341, 342) in each of said at least one drive unit (241, 242, 243, 244, 245), comparing the pace signal (p41) from the first drive motor (341) with the pace signal (p42) from the second drive motor (342) from each of said at least one drive unit (241, 242, 243, 244, 245) to establish a respective difference in the rotational speeds in each of said at least one drive unit, and when the difference exceeds a threshold value, triggering an alarm (A).

\* \* \* \* \*